United States Patent [19]
Nicholson

[11] Patent Number: 4,513,978
[45] Date of Patent: Apr. 30, 1985

[54] CYLINDER HEAD GASKET

[76] Inventor: Terence P. Nicholson, Calf Hall, Muggleswick, Derwentside, Co. Durham, England

[21] Appl. No.: 332,211

[22] Filed: Dec. 18, 1981

[30] Foreign Application Priority Data

Dec. 19, 1980 [GB] United Kingdom ............... 8040880

[51] Int. Cl.³ .................. F16J 15/48; F16J 15/32; F16K 41/00
[52] U.S. Cl. ................. 277/235 B; 277/209; 123/193 CH
[58] Field of Search ............. 277/236, 235 B, 207 R, 277/208, 213, 11; 123/193 CH

[56] References Cited

U.S. PATENT DOCUMENTS

| | | | |
|---|---|---|---|
| 1,731,404 | 10/1929 | Wetherill | 277/11 X |
| 3,167,320 | 1/1961 | Kyle | 277/236 |
| 3,432,177 | 3/1969 | Colwell | 277/236 |
| 3,843,141 | 10/1974 | Kuhn | 123/198 CH X |

FOREIGN PATENT DOCUMENTS 2406136 10/1977 France .................. 277/213

OTHER PUBLICATIONS

*French English Technical Dictionary*, Chemical Publishing Co., Inc., N.Y., N.Y., 1957, p. 375.

Primary Examiner—John M. Jillions
Assistant Examiner—Lloyd D. Doigan
Attorney, Agent, or Firm—Murray Schaffer

[57] ABSTRACT

A gasket is particularly intended for sealing the joint between the cylinder block (4), the cylinder head and a liner (3) inserted in the cylinder block. Such a gasket (G) is of annular shape and comprises a varying thickness radial corrugated part (1) with an annular skirt (2) depending from its outside periphery. The part (1) is intended to be accommodated in an end recess (3a) in the cylinder liner which also has a radially outer recess (3b) which accommodates the skirt (2) so as accurately to center the gasket around the cylinder bore.

2 Claims, 3 Drawing Figures

CYLINDER HEAD GASKET

BACKGROUND TO THE INVENTION

This invention relates to gaskets for sealing the joint between the cylinder block and the cylinder head of internal combustion engines and particularly to gaskets for this purpose which have to seal loose liners in the cylinder blocks of high compression diesel engines.

Problems which arise with known gaskets used for the purpose are fourfold, namely 1. They require to be subjected to a very high clamping load in order to ensure a satisfactory gas-tight seal.
2. Their inability to resist such loading;
3. Difficulty due to the variations in height which occur between the top of the liner and the cylinder block platform; and
4. The difficulty of loading the gasket accurately during assembly, especially with 'Vee' and horizontal cylinder axis engines.

With the general object of solving these problems there is proposed in accordance with the invention a cylinder head gasket of annular shape and varying thickness corrugated radial cross-section with an annular skirt depending from its outside periphery.

The invention accordingly also consists in a gasket as aforesaid in combination with a cylinder head and cylinder block assembly including a cylinder liner having an end recess which accommodates the corrugated radial cross-section part of the gasket and a radially outward open recess which accommodates the gasket skirt.

Preferably the locating skirt of the gasket is constituted by a ring made for instance of stainless steel fixed to the outer periphery of the gasket, and the varying thickness corrugated part has three maximum thickness portions with plane faces and inter-face angles of about 120°.

DESCRIPTION OF DRAWINGS

A preferred embodiment of a gasket according to the invention is illustrated in the accompanying drawings in which.

DESCRIPTION OF PREFERRED EMBODIMENT

Figure 1:
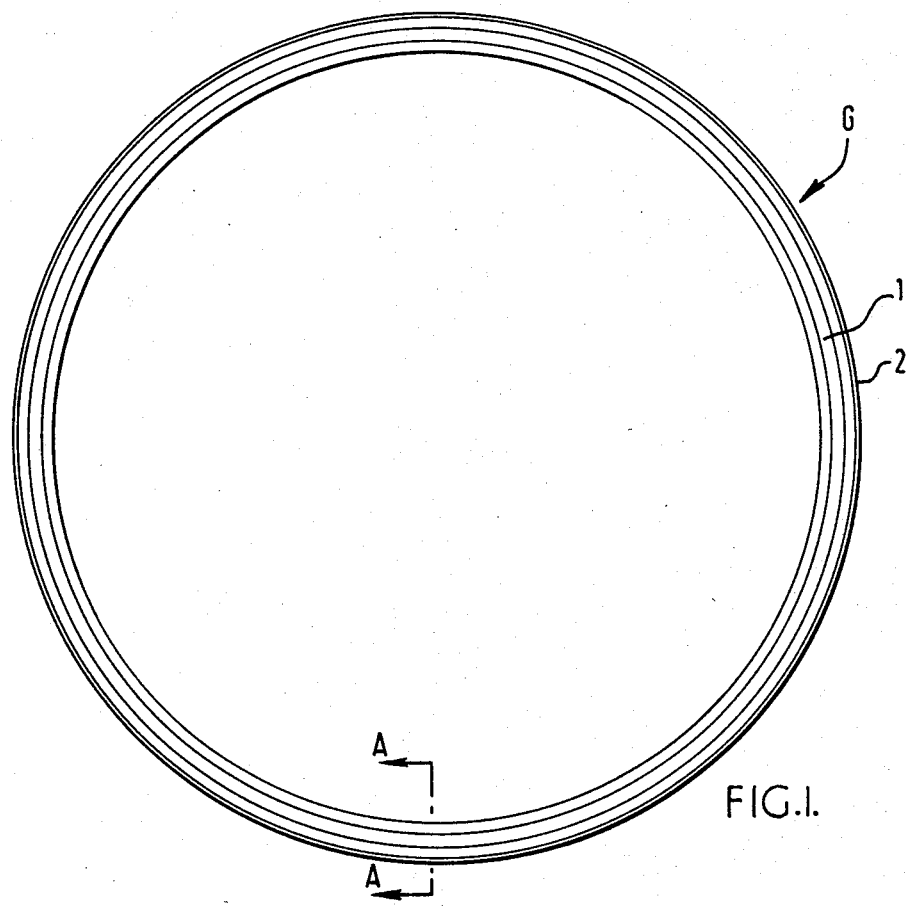
FIG. 1 is a plan view.
Figure 2:
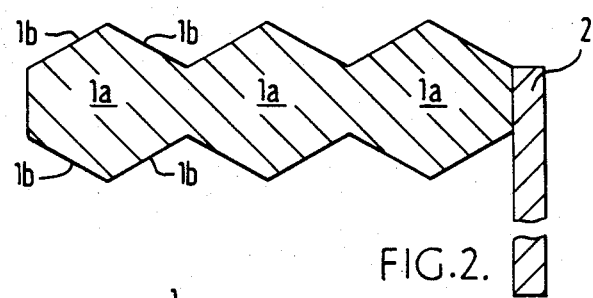
FIG. 2 is a greatly enlarged section on line A—A of FIG. 1.

Referring now to the drawings, the typical gasket G therein shown is of circular annular shape and is intended to seal the joint between the cylinder block, cylinder liner in the cylinder block, and the cylinder head of a high compression diesel engine.

The gasket essentially comprises a varying depth metal corrugated ring 1 which has three double corrugated sections 1a each bounded by inclined faces 1b which in radial cross-section are mutually inclined at 120°. Typically the overall diameter may be between 5.52 and 5.54 inches and the overall thickness between 0.070 and 0.075 inches. The inside diameter may be 5.070 inches and the height between peaks and troughs of the corrugated sections 0.022 inches. The respective diameters to the two troughs between the three sections 1b are 5.221 inches and 5.372 inches.

To the outside edge of the three corrugated sections 1a there is spot welded a cylindrical stainless steel ring or skirt 2 which typically is between 0.173 and 0.143 inches in axial length and 0.015 inch in thickness.

Figure 3:
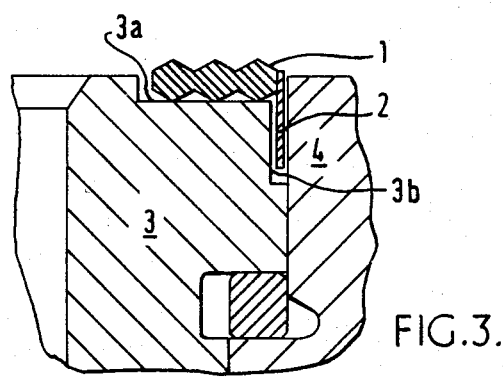
FIG. 3 is an enlarged radial section showing the gasket seated upon a cylinder liner.

As shown most clearly in FIG. 3 the gasket is intended to be supported by its corrugated part on the platform recess 3a of a loose liner 3 fitted in a cylinder 4, the liner 3 being formed also with a radially outer recess 3b which accommodates the skirt 2 of the gasket which thereby serves accurately to centre the gasket around the cylinder bore during assembly.

One effect of the gasket according to the invention is that in use the clamping load applied to it by the cylinder head is restricted to clearly defined areas with the result that the high loads necessary to obtain a fluid tight seal can be achieved yet at the same time the total load on the rim of the liner is very much lower than that required for conventional gaskets.

A second effect is that the multiple peaks of the gasket form a labyrinth seal whilst the troughs enable surplus material to flow to take up liner height differences.

There has thus been provided:

1. A gasket suitable for sealing the bores on high compression diesel engines with an outer skirt for location.
2. A gasket with high unit loading notwithstanding a total load well within acceptable loads on a cylinder liner.
3. A gasket with serrations on both faces such as to have a labyrinth effect which greatly enhances its sealing qualities, especially when the sealing surfaces are of poor quality.
4. A gasket with an outer skirt which greatly assists in the assembly of the engine, especially when it is a 'V' block engine.
5. A gasket that can cope with variations in height of a cylinder liner due to machining tolerances.
6. A gasket that can be manufactured in stainless steel (high temperature resisting) or low carbon steel to suit its environment. It is recommended that carbon steel rings should be nickel plated.

I claim:

1. The combination of a gasket and cylinder head and cylinder block assembly including a cylinder liner having an end recess, said gasket comprising a substantially planar ring being in radial cross section of varying thickness corrugation, and having an annular skirt integrally depending from the outer peripheral edge for locating said ring with respect to the bore of the liner said recess accommodating the corrugated radial cross section part of the gasket and a radially outward open recess which accommodates the gasket skirt.

2. A gasket in accordance with claim 1, in which the varying thickness corrugated part has three maximum thickness portions with plane faces and interface angles of about 120 degrees.

* * * * *